(12) United States Patent
Marchand et al.

(10) Patent No.: US 11,002,375 B2
(45) Date of Patent: May 11, 2021

(54) MULTI-CHANNEL DISC VALVE ASSEMBLY

(71) Applicant: Johnson Electric International AG, Murten (CH)

(72) Inventors: Olivier Marchand, Murten (CH); Emmanuel Vuichard, Epagny (CH)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 42 days.

(21) Appl. No.: 16/428,301

(22) Filed: May 31, 2019

(65) Prior Publication Data
US 2019/0368621 A1    Dec. 5, 2019

(30) Foreign Application Priority Data

May 31, 2018   (GB) ...................................... 1808925
Jun. 1, 2018   (GB) ...................................... 1808977

(51) Int. Cl.
| | |
|---|---|
| *F16K 11/074* | (2006.01) |
| *F16K 11/07* | (2006.01) |
| *F16K 11/076* | (2006.01) |
| *F16K 11/085* | (2006.01) |
| *F16K 31/04* | (2006.01) |

(52) U.S. Cl.
CPC ........ *F16K 11/0743* (2013.01); *F16K 11/076* (2013.01); *F16K 11/0712* (2013.01); *F16K 11/085* (2013.01); *F16K 31/043* (2013.01)

(58) Field of Classification Search
CPC .. F16K 11/0712; F16K 11/076; F16K 11/085; F18K 31/043
See application file for complete search history.

(56) References Cited

U.S. PATENT DOCUMENTS

| | | | | |
|---|---|---|---|---|
| 3,951,166 A | * | 4/1976 | Whitener | ............ F16K 11/0712 |
| | | | | 137/625.27 |
| 4,711,392 A | * | 12/1987 | Kidouchi | ................ F16K 11/20 |
| | | | | 236/12.12 |
| 5,025,983 A | * | 6/1991 | Akita | .................... F16K 11/207 |
| | | | | 236/12.2 |

(Continued)

FOREIGN PATENT DOCUMENTS

WO    WO-2016153390 A1 * 9/2016 ............... F16K 3/08

*Primary Examiner* — Kevin R Barss
(74) *Attorney, Agent, or Firm* — Millman IP Inc.

(57) ABSTRACT

A multi-channel disc valve assembly including: a first inlet chamber having a first inlet port; a second inlet chamber having a second inlet port; a multi-channel mixing chamber body having at least one first chamber opening fluidly communicable with the first inlet chamber and at least one second chamber opening fluidly communicable with the second inlet chamber; a first disc valve sub-assembly positioned between the first inlet chamber and the multi-channel mixing chamber body, the first disc valve sub-assembly including a first movable disc; and a second disc valve sub-assembly positioned between the second inlet chamber and the multi-channel mixing chamber body, the second disc valve sub-assembly including a second movable disc; the first and second movable discs being rotatable to respectively alter fluid flow pathways from the first inlet chamber to the multi-channel mixing chamber body and from the second inlet chamber to the multi-channel mixing chamber body.

20 Claims, 4 Drawing Sheets

(56) References Cited

U.S. PATENT DOCUMENTS

| | | | | |
|---|---|---|---|---|
| 7,913,926 B2* | 3/2011 | Goncze | ............ | G05D 23/1346 |
| | | | | 236/12.2 |
| 8,631,823 B2* | 1/2014 | Heerklotz | ........... | F16K 31/5286 |
| | | | | 137/625.4 |
| 2013/0105326 A1* | 5/2013 | Averbeck | ............ | F16K 11/0716 |
| | | | | 204/661 |
| 2018/0073224 A1* | 3/2018 | Bornovolokov | ...... | F16K 19/006 |

* cited by examiner

MULTI-CHANNEL DISC VALVE ASSEMBLY

CROSS REFERENCE TO RELATED APPLICATIONS

This non-provisional patent application claims priority under 35 U.S.C. § 119(a) from Patent Application No. 1808925.0 filed in United Kingdom on May 31, 2018 and Patent Application No. 1808977.1 filed in United Kingdom on Jun. 1, 2018.

FIELD

The present invention relates to a multi-channel disc valve assembly suitable but not necessarily exclusively for use in automotive cooling fluid control systems. The invention further relates to a multi-channel disc valve system, and to a method of assembling such a multi-channel disc valve system.

BACKGROUND

To provide multi-way valves for selectably controlling fluid flow around a system in a compact manner, there is currently a limited range of choices. Multi-way ball valves are available, but are also bulky and relatively expensive to manufacture due to the precision required to create a fluid-tight seal.

Such ball valve arrangements also typically require a plurality of actuators to control each ball individually, which further increases the complexity of manufacture of such an apparatus.

Furthermore, in order to provide suitable fluid-tightness, existing multi-way valves must be produced as a single unit. This limits the utility of multi-way valves, since a bespoke valve arrangement must be created for each different application.

As more complicated cooling arrangements are required, particularly in automotive contexts where hybrid vehicles are provided, which require additional cooling for batteries, for example, there is a greater need for cost-effective and simple multi-way valve arrangements to be provided.

The present invention seeks to provide a multi-channel disc valve assembly which overcomes these issues.

SUMMARY

According to a first aspect of the invention, there is provided a multi-channel disc valve assembly comprising: a first inlet chamber having a first inlet port; a second inlet chamber having a second inlet port; a multi-channel mixing chamber body having at least one first chamber opening fluidly communicable with the first inlet chamber and at least one second chamber opening fluidly communicable with the second inlet chamber, the multi-channel mixing chamber body having a plurality of outlet ports; a first disc valve sub-assembly positioned between the first inlet chamber and the multi-channel mixing chamber body, the first disc valve sub-assembly comprising a first movable disc; and a second disc valve sub-assembly positioned between the second inlet chamber and the multi-channel mixing chamber body, the second disc valve sub-assembly comprising a second movable disc; the first and second movable discs being rotatable to respectively alter a fluid flow pathway from the first inlet chamber to the multi-channel mixing chamber body and a fluid flow pathway from the second inlet chamber to the multi-channel mixing chamber body.

A disc valve assembly will be typically much cheaper and more durable than an equivalent ball valve assembly. However, the structure of disc valves makes them much more difficult to up-scale for multi-way diversion of fluid through a system, and as such, only single-stage disc valves are presently available. The present invention has found that a modified central mixing chamber structure allows for multi-way input therein whilst utilising disc valves. The movable discs can be rotated to achieve selective control over the fluid flow.

Optionally, a relative configuration between the first movable disc and the or each first chamber opening may be different to a relative configuration between the second movable disc and the or each second chamber opening.

Preferably, the first disc valve sub-assembly may comprise a first sealing element which has a matching shape to the or each first chamber opening, the first sealing element being positioned between the first movable disc and the multi-channel mixing chamber body.

The first sealing element may include a first static plate against which the first movable disc is rotatable.

The first static plate may be formed as a disc having at least one aperture which is matched to the or each first chamber opening.

The second disc valve sub-assembly may comprise a second sealing element which has a matching shape to the or each second chamber opening, the second sealing element being positioned between the second movable disc and the multi-channel mixing chamber body.

Preferably, the second sealing element may include a second static plate against which the second movable disc is rotatable.

The second static plate may be formed as a disc having at least one aperture which is matched to the or each second chamber opening.

The provision of the matched sealing element to the chamber openings ensures that there is no leakage from the first or second inlet chamber into the wrong outlet chamber. This can be a significant issue for pressurised fluid. The easiest way to construct such an arrangement would be to provide a static disc as part of each disc valve sub-assembly which can compress the sealing element against the multi-channel mixing chamber body, whilst providing a flat surface against which the movable disc can rotate freely.

Optionally, at least one of the first and second movable discs may have a quarter-circle aperture therethrough.

A quarter opening provides the option for four-way control of flow through each of the ends of the multi-channel mixing chamber body, which allows for the complex flow pathway configurations of the present invention to be achieved.

In one embodiment, the multi-channel mixing chamber body may have two said outlet ports.

A two-outlet port arrangement allows for the creation of a four-way mixing assembly, which is a successful arrangement within the sphere of ball valve assemblies.

In an alternative embodiment, the multi-channel mixing chamber body may have three said outlet ports.

Preferably, a first end of the multi-channel mixing chamber body may comprise three said first chamber openings corresponding with the three said outlet ports, and wherein a second end of the multi-channel mixing chamber body comprises two said second chamber openings corresponding with two of the three said outlet ports.

A three-outlet port arrangement is also a successful arrangement used in ball valve assemblies, and is of particular use in hybrid vehicular technologies, where coolant fluid may be required for at least three components of a cooling system thereof. The specific arrangement of the five-way mixing assembly can result in divergent flows and mixed flows, which may achieve pressurisation gains which may be necessary for successful operation of the system.

Preferably, the first inlet chamber, multi-channel mixing chamber body, and second inlet chamber may be provided in a stacked configuration.

A stacked configuration is primarily useful as a means of creating a space-efficient apparatus allowing for ready integration into existing applications. Furthermore, it can allow for ready replacement of the central mixing chamber assembly as part of a modular system, which can reduce manufacturing costs as only this component need be replaced to provide a bespoke fluid flow configuration.

The assembly may further comprise a shaft which is engaged with the first and second movable discs to permit simultaneous rotation thereof.

The multi-channel disc valve assembly may preferably further comprise an actuator which is drivably coupled, preferably via the shaft, to drive both of the first and second movable discs, which may be a brushless DC electric motor.

Simultaneous rotation of the movable discs has the benefit of removing the requirement to provide independent actuators for each movable disc, which is otherwise necessary in corresponding ball valve arrangements. One shaft can be used to produce the complex flow pathway arrangements, which is driven by one actuator. This reduces both the cost and complexity of the multi-channel disc valve assembly.

Preferably, the multi-channel mixing chamber body may comprise a shaft-receiving bore extending therethrough for receiving the shaft.

The provision of a central bore through the multi-channel mixing chamber body not only improves the support of the shaft in situ, but also assists in creating the advantageous stacked arrangement of the assembly.

The assembly may also comprise a multi-part valve casing, a first valve casing part being provided for the first inlet chamber, a second valve casing part being provided for the second inlet chamber, and a third valve casing part being provided for the multi-channel mixing chamber body.

Using a multi-part casing further improves the ability to modularise the assembly, permitting the selective insertion of an appropriate multi-channel mixing chamber body without needing to replace the inlet chambers for each new system.

Optionally, each of the first movable disc and second movable disc may be formed from a ceramic material.

The multi-channel mixing chamber body may comprise a plurality of fluidly-noncommunicable chamber body portions.

The use of fluidly-noncommunicable body portions improves the resistance of the assembly to leakage between the various fluid-flow pathways defined as the movable discs rotate.

According to a second aspect of the invention, there is provided a multi-channel disc valve system comprising: a first inlet chamber having a first inlet port; a second inlet chamber having a second inlet port; a mixing chamber assembly comprising: a multi-channel mixing chamber body having at least one first chamber opening fluidly communicable with the first inlet chamber and at least one second chamber opening fluidly communicable with the second inlet chamber, the multi-channel mixing chamber body having a plurality of outlet ports; a first disc valve sub-assembly positioned at a first end of the multi-channel mixing chamber body, the first disc valve sub-assembly comprising a first movable disc; a second disc valve sub-assembly positioned at a second end of the multi-channel mixing chamber body, the second disc valve sub-assembly comprising a second movable disc; and a drive transmission means which is engaged with the first and second movable discs; and an actuator drivably coupled to the drive transmission means; the first and second movable discs respectively alter a fluid flow pathway from the first inlet chamber to the multi-channel mixing chamber body and a fluid flow pathway from the second inlet chamber to the multi-channel mixing chamber body.

Preferably, the mixing chamber assembly may be fluidly communicable with the first and second inlet chambers such that a relative configuration between the first movable disc and the or each first chamber opening is different to a relative configuration between the second movable disc and the or each second chamber opening when the drive transmission means is driven by the actuator.

A system having a single actuator which is able to drive both movable discs, and having a complex relationship between the chamber openings of the multi-channel mixing chamber body and the first and second movable discs, provides a cost-effective and durable mechanism by which a variable fluid control system can be achieved, which is particularly suitable for use in vehicular contexts, and in particular for electric and/or hybrid electric vehicles where many components require cooling.

A plurality of different said mixing chamber assemblies may be provided, each mixing chamber assembly being selectably engagable in fluid communication with the first and second inlet chambers to provide different fluid flow pathway configurations between the first inlet chamber and multi-channel mixing chamber body and between the second inlet chamber and the multi-channel mixing chamber body.

Selectable engagement of a standardised set of inlet chambers with a desired configuration of multi-channel mixing chamber advantageously reduces the cost of manufacture of the disc valve assembly, since a smaller percentage of the components of the assembly must be created specifically for the application.

According to a third aspect of the invention, there is provided a method of assembling a multi-channel disc valve system preferably in accordance with the second aspect of the invention, the method comprising the steps of: a] engaging the first inlet chamber at the first end of the multi-channel mixing chamber body of the mixing chamber assembly; b] engaging the second inlet chamber at the second end of the multi-channel mixing chamber body of the mixing chamber assembly; c] connecting the shaft to the actuator; and d] securing the actuator, first inlet chamber, mixing chamber assembly and second inlet chamber together via a valve casing.

The assembly of a modular multi-channel disc valve system in which the central assembly can be manufactured and assembled with standardized inlet chambers significantly reduces the complexity of producing a customized disc valve system, particularly for an automotive cooling system.

According to a fourth aspect of the invention, there is provided a multi-channel disc valve assembly comprising: a first inlet chamber having a first inlet port; a second inlet chamber having a second inlet port; a multi-channel mixing chamber body having at least one first chamber opening fluidly communicable with the first inlet chamber and at least one second chamber opening fluidly communicable with the second inlet chamber, the multi-channel mixing chamber body having a plurality of outlet ports; a first disc valve sub-assembly positioned between the first inlet chamber and the multi-channel mixing chamber body, the first disc valve sub-assembly comprising a first static disc and a first movable disc, the first movable disc being rotatable relative to the first static disc; a second disc valve sub-assembly positioned between the second inlet chamber and the multi-channel mixing chamber body, the second disc valve sub-assembly comprising a second static disc and a second movable disc, the second movable disc being rotatable relative to the second static disc; and a shaft which is engaged with the first and second movable discs, the shaft being drivable to simultaneously rotate the first and second movable discs to respectively alter a fluid flow pathway from the first inlet chamber to the multi-channel mixing chamber body and a fluid flow pathway from the second inlet chamber to the multi-channel mixing chamber body.

The assembly may further comprise an actuator which is drivably coupled to drive both of the first and second movable discs.

BRIEF DESCRIPTION OF THE DRAWINGS

The invention will now be more particularly described, by way of example only, with reference to the accompanying drawings, in which.

DETAILED DESCRIPTION

Figure 1:
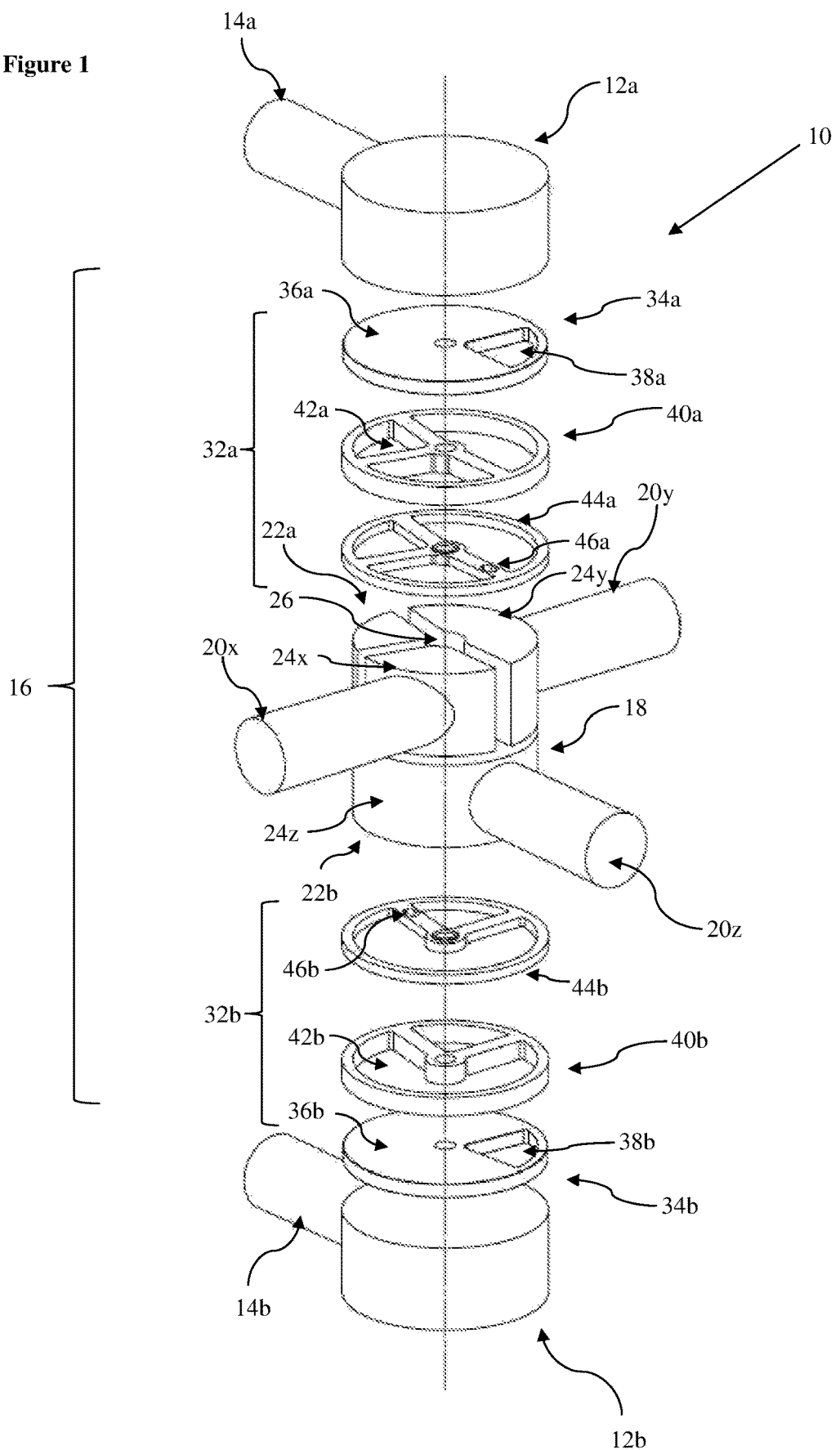
FIG. 1 shows an exploded perspective representation of one embodiment of a multi-channel disc valve assembly in accordance with the first aspect of the invention.

Referring to FIG. 1, a multi-channel disc valve assembly, referenced globally at 10, is shown which is suitable for, in particular, fluid flow control of coolant fluid within an automotive context. This may be of particular use for hybrid or electric vehicle systems, where cooling fluid may need to be diverted between many different systems, such as the battery, electronic control system, and so on, during operation of the vehicle.

The multi-channel disc valve assembly 10 comprises first and second inlet chambers 12a, 12b, each having an inlet port 14a, 14b via which fluid can be introduced to the first and second inlet chambers 12a, 12b respectively. These components may be common to any multi-channel disc valve assembly 10 constructed in accordance with the present invention.

The central components positioned between the first and second inlet chambers 12a, 12b can be collectively considered to be a mixing chamber assembly 16, and may be bespoke depending upon the application of the multi-channel disc valve assembly 10. The multi-channel disc valve assembly 10 is therefore preferably formed from a plurality of modules which may be interchangeable and/or selectably interengagable, with the mixing chamber assembly 16 being different for different uses of the multi-channel disc valve assembly 10.

The mixing chamber assembly 16 comprises a multi-channel mixing chamber body 18, which has a plurality of outlet ports 20x, 20y, 20z. As indicated in FIG. 1, there are three outlet ports 20x, 20y, 20z in the present arrangement, forming a five-way multi-channel disc valve assembly 10. Alternative arrangements could, of course be provided; a four-way multi-channel disc valve assembly may be particularly useful in which a multi-channel mixing chamber body includes only two outlet ports, but the multi-channel disc valve assembly can be scaled according to requirements. In particular, a six-way assembly, in which there are four outlet ports, and a seven-way assembly, in which there are five outlet ports, may be readily achievable, and arrangements with even more outlet ports are also possible. Furthermore, it may be possible to introduce arrangements having more than two inlet ports, if the system were to be scaled further.

The multi-channel mixing chamber body 18 has first and second ends 22a, 22b which are respectively associated with the first and second inlet chambers 12a, 12b. Each of the first and second ends 22a, 22b is associated with a plurality of chamber openings which are respectively communicable with outlet chambers of the multi-channel mixing chamber body 18.

The multi-channel mixing chamber body 18 here comprises a plurality of fluidly-noncommunicable chamber body portions which define the three outlet chambers 24x, 24y, 24z of the present arrangement, corresponding with the three outlet ports 20x, 20y, 20z. There is also provided a shaft-receiving bore 26 which extends through the centre of the multi-channel mixing chamber body 18.

Figure 3:
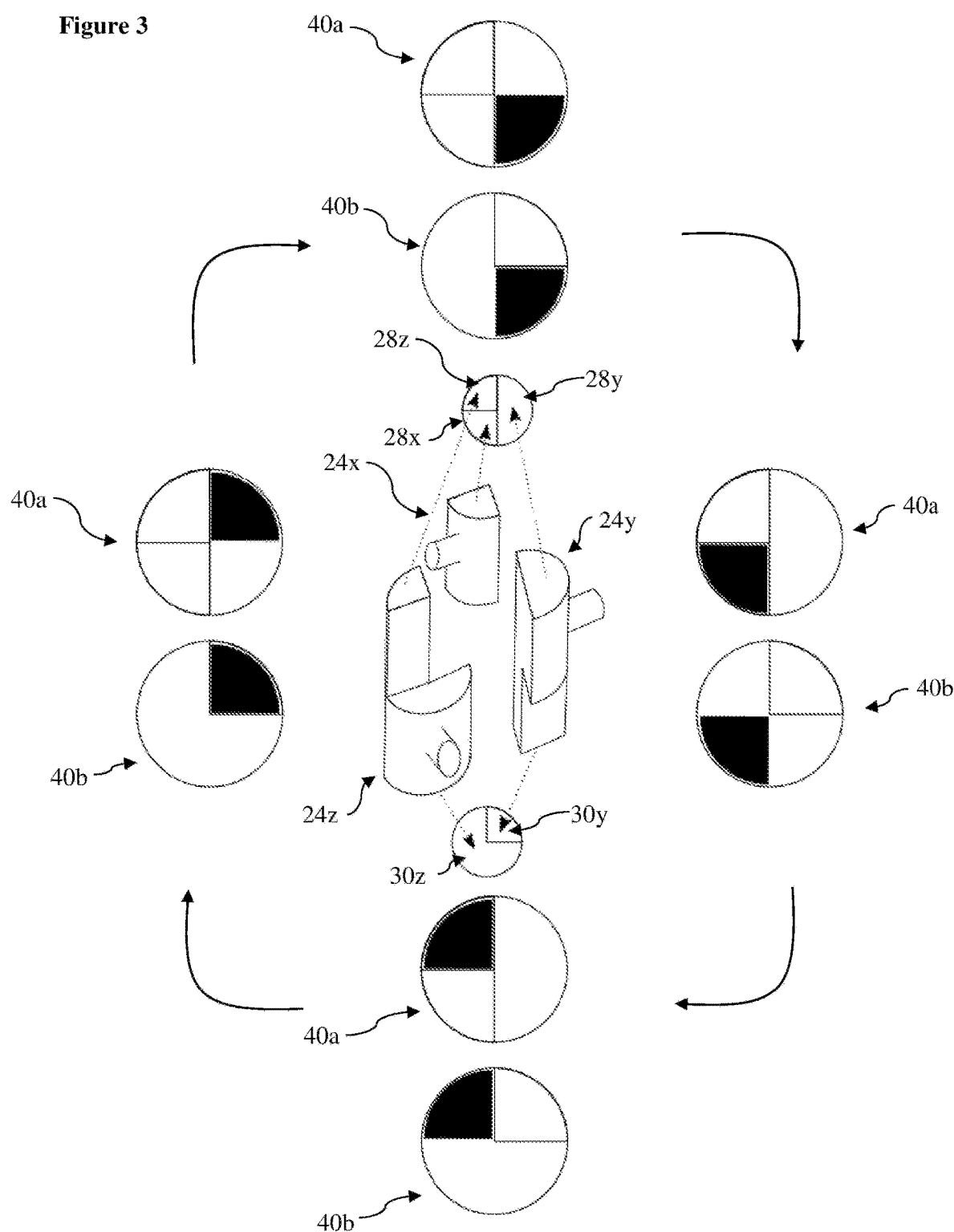
FIG. 3 shows a diagrammatic representation of the alignment between the first and second movable and static discs of the multi-channel disc valve assembly of FIG. 1, with the central legend indicating an exploded view of the chambers and chamber openings of the multi-channel mixing chamber body, the upper circles around FIG. 3 representing the first movable and static discs when viewed from a first end of the multi-channel mixing chamber body, and the lower circles representing the second movable and static discs as if viewed from the first end of the multi-channel mixing chamber body.

The first outlet chamber 24x here has a single upper chamber opening 28x—best illustrated in the legend of FIG. 3—which is positioned at the first end 22a of the multi-channel mixing chamber body. As such, it is only possible for fluid to be directed through the first outlet port 20x from the first inlet port 14a, provided the fluid pathway therebetween is unsealed. The chamber opening 28x may be formed as a quarter-circle, for example.

The second outlet chamber 24y here has upper and lower chamber openings 28y, 30y which are respectively positioned at the first and second ends 22a, 22b of the multi-channel mixing chamber body. The upper and lower chamber openings 28y, 30y preferably have different dimensions, with the upper chamber opening 28y being shaped as a half-circle, and the lower chamber opening 30y being formed as a quarter-circle.

The third outlet chamber 24z also has upper and lower chamber openings 28z, 30z which are respectively positioned at the first and second ends 22a, 22b of the multi-channel mixing chamber body. Again, the upper and lower chamber openings 28z, 30z preferably have different dimensions, with the upper chamber opening 28z being shaped as a quarter-circle, and the lower chamber opening 30z being formed as a three-quarter-circle.

Selective opening and closure of the chamber openings 28x, 28y, 28z, 30y, 30z permits the fluid flow pathways through the multi-channel mixing chamber body 18 from the first and second inlet chambers 12a, 12b to be altered. This can be achieved by the use of disc valves.

A first disc valve sub-assembly 32a is provided which comprises at least a first movable disc 34a which has a disc body 36a having at least one aperture 38a therethrough. The first disc valve sub-assembly 32a is positionable between the first inlet chamber 12a and the first end 22a of the multi-channel mixing chamber body 18 to permit the changing of the fluid flow into the three upper chamber openings 28x, 28y, 28z.

The first disc valve sub-assembly 32a preferably also includes a static plate against which the first movable disc 34a is rotatable, which is preferably formed as a first static disc 40a having a plurality of apertures 42a which match the configuration of the upper chamber openings 28x, 28y, 28z. It is also preferred that a first sealing element 44a is provided which prevents leakage between the first movable disc 34a and the multi-channel mixing chamber body 18, and this is preferably positioned between the first static disc 40a and the multi-channel mixing chamber body 18, having an aperture configuration which corresponds with that of the first static disc 40a.

A second disc valve sub-assembly 32b is also provided which comprises at least a second movable disc 34b which has a disc body 36b having at least one aperture 38b therethrough. The second movable disc 34b preferably has an identical shape or form to the first movable disc 34a. The second disc valve sub-assembly 32b is positionable between the second inlet chamber 12b and the second end 22b of the multi-channel mixing chamber body 18 to permit the changing of the fluid flow into the two lower chamber openings 30y, 30z.

The second disc valve sub-assembly 32b preferably also includes a static plate against which the second movable disc 34b is rotatable, which is preferably formed as a second static disc 40b having a plurality of apertures 42b which match the configuration of the lower chamber openings 30y, 30z. It is also preferred that a second sealing element 44b is provided which prevents leakage between the second movable disc 34b and the multi-channel mixing chamber body 18, and this is preferably positioned between the second static disc 40b and the multi-channel mixing chamber body 18, having an aperture configuration which corresponds with that of the second static disc 40b.

Each of the first and second movable discs 34a, 34b may preferably be formed from a ceramic material. The first and second static discs 40a, 40b may also be formed from a similar or identical material to the first and second movable discs 34a, 34b.

The first and second sealing elements 44a, 44b may preferably be formed from a flexible or resilient sealing material, such as rubber or an elastomeric material, and may include a locator 46a, 46b which is able to locate the sealing element 44a, 44b with respect to its respective static disc 40a, 40b and/or to the multi-channel mixing chamber body 18.

Figure 2B:
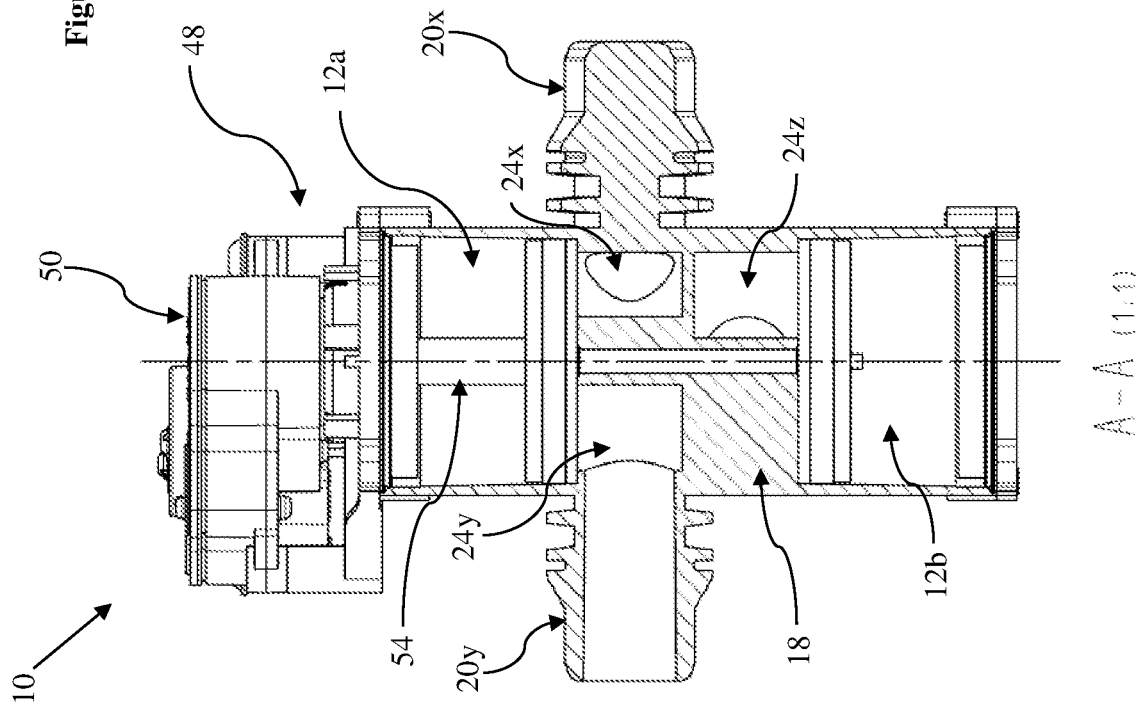
FIG. 2b shows a cross-section through the multi-channel disc valve system of FIG. 2a taken through line A-A.
Figure 2A:
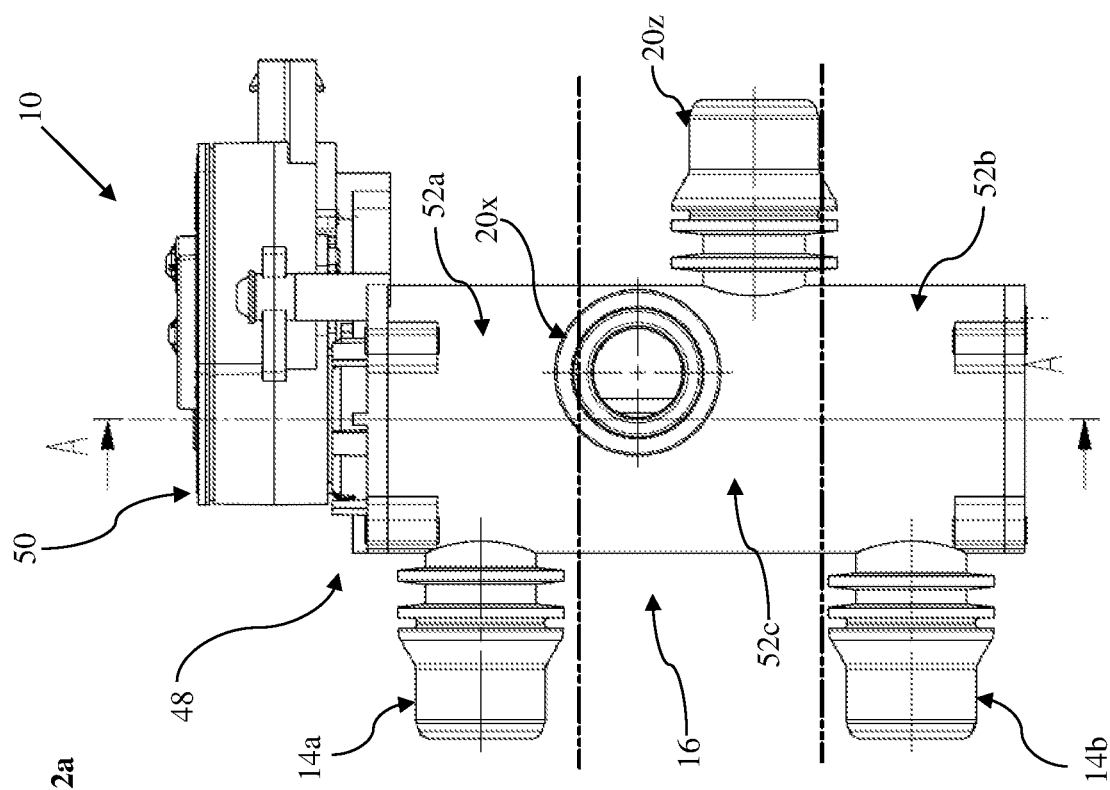
FIG. 2a shows a side view of a multi-channel disc valve system in accordance with the second aspect of the invention, utilising the multi-channel disc valve assembly of FIG. 1.

FIG. 2a shows the multi-channel disc valve assembly 10 inclusive of the valve casing 48, which is connected at one end to an actuator 50, preferably a brushless DC electric motor, which is able to control the rotation of the movable discs 34a, 34b. Preferably, the valve casing 48 is formed in three parts: a first valve casing part 52a being provided for the first inlet chamber 12a, a second valve casing part 52b being provided for the second inlet chamber 12b, and a third valve casing part 52c being provided for the multi-channel mixing chamber body 18. This allows the multi-channel disc valve assembly 10 to be assembled in a modular manner, and potentially allows the third valve casing part 52c to be selected according to the desired function of the multi-channel disc valve assembly 10.

The cross-section through the multi-channel disc valve assembly 10 of FIG. 2a along line A-A can be seen in FIG. 2b, in which the drive transmission means of the actuator 50 can be seen. The actuator 50 is here coupled to a shaft 54 which extends through the first inlet chamber 12a, the first disc valve sub-assembly 32a, the multi-channel mixing chamber body 18, and the second disc valve assembly 32b. This arrangement illustrates the advantage of a stacked assembly in which the first inlet chamber 12a, the multi-channel mixing chamber body 18, and the second inlet chamber 12b are linearly aligned; the shaft 54 can engage with both the first and second movable discs 34a, 34b, coupling their rotational motion, and allowing the assembly 10 to be constructed with only a single actuator 50. The shaft 54 is preferably supported through the multi-channel mixing chamber body 18 by the shaft-receiving bore 26 thereof. Preferably, such a stacked assembly will have symmetric inlet ports 14a, 14b, with the intermediate mixing chamber assembly 16 being adapted according to the needs of the flow.

As can be seen in FIG. 2b, first, second and third mixing chambers 24x, 24y, 24z are provided which are associated with the three outlet ports 20x, 20y, 20z; when the first and/or second aperture 38a, 38b of the movable discs 34a, 34b is aligned with the corresponding chamber opening 28x, 28y, 28z, 30y, 30z of the mixing chambers 24x, 24y, 24z, a fluid flow pathway can be achieved to direct a fluid in the multi-channel disc valve assembly 10 along a desired direction.

Driving of the actuator 50 will result in rotation of the shaft 54, which will result in simultaneous rotation of the movable discs 34a, 34b. The effect of this rotation can be seen in FIGS. 3 and 4.

In FIG. 3, the upper and lower circles indicate the shapes of the first and second static discs 40a, 40b respectively, with the shaded quarter-circle indicating the relative position of the apertures 38a, 38b of the first and second movable discs 34a, 34b respectively.

Figure 4:
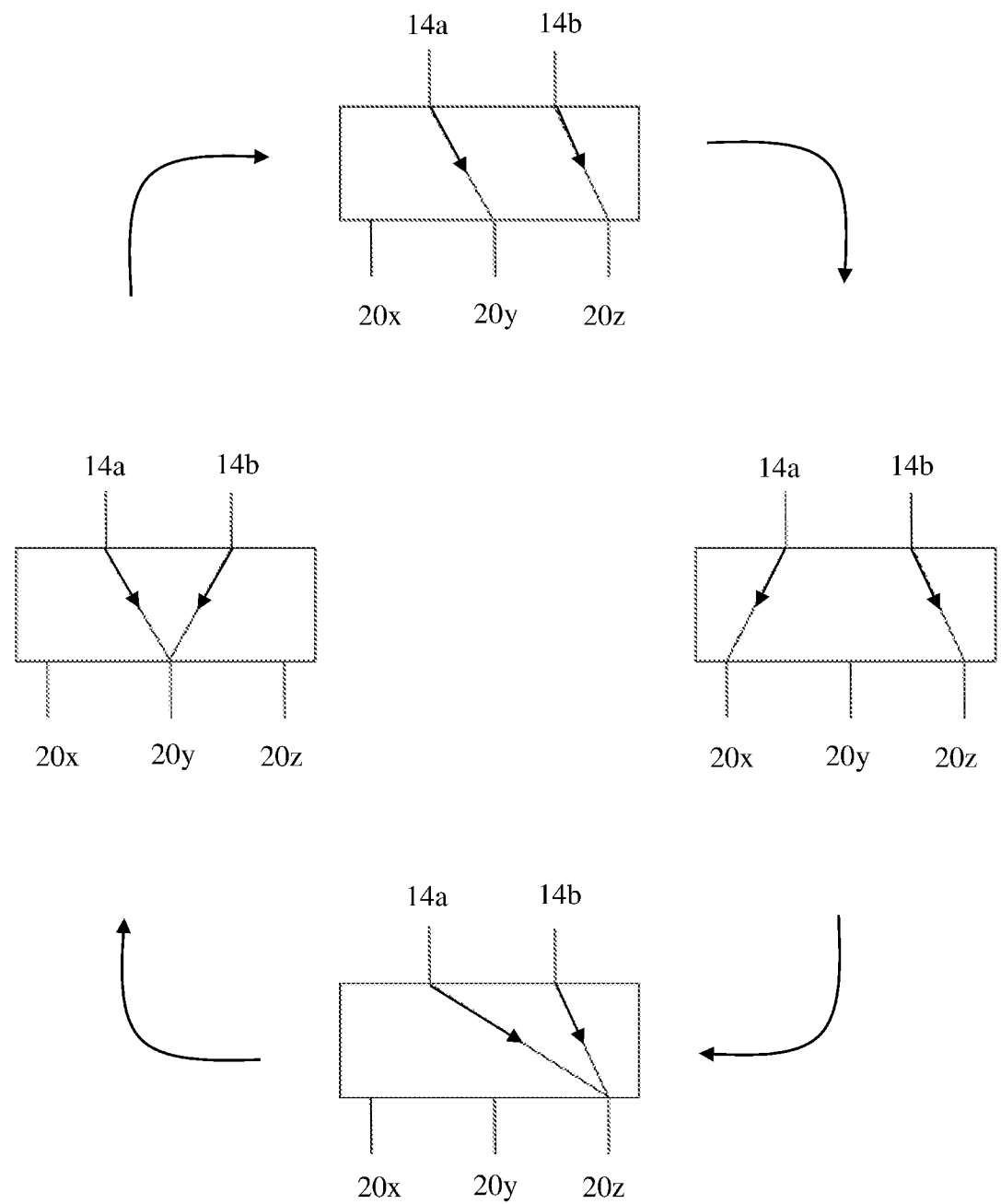
FIG. 4 shows a diagrammatic representation of a flow through the multi-channel mixing chamber body based on the alignments of the first and second movable and static discs illustrated in FIG. 3.

In a first rotational position, indicated by the top-centre images in each of FIGS. 3 and 4, which can be considered to be a rotational phase of 0°, the first aperture 38a of the first movable disc 34a is aligned with the upper chamber opening 28y of the second mixing chamber 24y, and the second aperture 38b of the second movable disc 34b is aligned with the lower chamber opening 30z of the third mixing chamber 24z. As such, there is a fluid flow pathway from the first inlet port 14a to the second outlet port 20y, and a fluid flow pathway from the second inlet port 14b to the third outlet port 20z.

Rotation of the first and second movable discs 34a, 34b in a clockwise direction, that is, to an effective phase of 90°, is shown in the right-hand image in each of FIGS. 3 and 4. The first aperture 38a is aligned with the upper chamber opening 28x of the first mixing chamber 24x, whilst, although the second movable disc 34b has been rotated, its aperture 38b remains aligned to the lower chamber opening 30z of the third mixing chamber 24z. As such, there is a fluid flow pathway from the first inlet port 14a to the first outlet port 20x, and a fluid flow pathway from the second inlet port 14b to the third outlet port 20z.

Both of these configurations result in divergent fluid flows through the multi-channel disc valve assembly 10.

Further rotation of the first and second movable discs 34a, 34b in a clockwise direction, that is, to an effective phase of 180°, is shown in the lower-centre image in each of FIGS. 3 and 4. The first aperture 38a is aligned with the upper chamber opening 28z of the third mixing chamber 24z, and the second aperture 38b remains aligned to the lower chamber opening 30z of the third mixing chamber 24z. As such, there is a fluid flow pathway from both the first inlet port 14a and second inlet port 14b to the third outlet port 20z, resulting in mixing of the fluids transported therethrough.

Further rotation of the first and second movable discs 34a, 34b in a clockwise direction, that is, to an effective phase of 270°, is shown in the left-hand image in each of FIGS. 3 and 4. The first aperture 38a is aligned with the upper chamber opening 28y of the second mixing chamber 24y, and the second aperture 38b becomes aligned to the lower chamber opening 30y of the second mixing chamber 24y. As such, there is a fluid flow pathway from both the first inlet port 14a and second inlet port 14b to the second outlet port 20y, resulting in mixing of the fluids transported therethrough.

One of the advantages of the multi-channel disc valve assembly 10 is that it is possible to provide a multi-channel disc valve system in which the first inlet chamber 12a and second inlet chamber 12b are standardised, with only the mixing chamber assembly 16 being replaced to alter the fluid flow properties thereof. The first and second disc valve sub-assemblies 32a, 32b are preferably provided as part of the mixing chamber assembly 16, since the form of the disc valve sub-assemblies 32a, 32b will likely be dependent on the forms of the mixing chamber openings.

Furthermore, it may be possible to provide a plurality of different said mixing chamber assemblies, with each mixing chamber assembly being selectably engagable in fluid communication with the first and second inlet chambers 12a, 12b to provide different fluid flow pathway configurations between the first inlet chamber 12a and multi-channel mixing chamber body 18 and between the second inlet chamber 12b and the multi-channel mixing chamber body 18. This effectively provides the modular set-up allowing the creation of disc valve assemblies which are bespoke to the application required.

The multi-channel disc valve may be assembled by engaging the first inlet chamber 12a at the first end 22a of the multi-channel mixing chamber body 18 of the mixing chamber assembly 16, and engaging the second inlet chamber 12b at the second end 22b of the multi-channel mixing chamber body 18 of the mixing chamber assembly 16. The shaft 54 can then be connected to the actuator 50 and the actuator 50, first inlet chamber 12a, mixing chamber assembly 16 and second inlet chamber 12b can be secured together via the valve casing 48.

Whilst the above-described arrangement utilises a single actuator having a linear output shaft, it will be apparent that an alternative drive transmission means for actuating the first and second movable discs could be provided. For example, a linked gear train could be provided, allowing the first and second inlet chambers to be positioned side-by-side. Alternatively, a plurality of actuators could be provided, allowing independent control of the fluid flow through the multi-channel disc valve assembly.

Similarly, it may be useful, in some arrangements, for there to be no mixing chamber coincident with all of the possible rotational phases of the movable discs. In such a scenario, it may be useful to provide a blocking element which prevents fluid flow into the mixing chamber assembly even where the aperture of the movable disc is aligned thereto.

It will also be appreciated that, although the selective direction of fluid within the system has been achieved in the present invention by mismatching of the upper and lower chamber openings relative to the apertures of the movable discs, it is possible to mismatch the apertures of the movable discs to one another in order to achieve the same effect, for example, by misalignment of the rotational phases of the apertures relative to one another. Indeed, a relative configuration between the first movable disc and the or each first chamber opening and the second movable disc and the or each second chamber opening may be the same, with the selective fluid flow being achieved by, for example, a complex internal geometry of the mixing chamber.

It is therefore possible to provide a multi-channel disc valve assembly which is suitable for providing selective direction of a fluid, such as a cooling fluid in automotive contexts, from two inlets to a plurality of different outlets. This is achieved by selecting different inlet profiles from the inlet chambers thereof into a mixing chamber assembly, and providing movable discs to provide selective control over the fluid communication therebetween. Where a stacked arrangement is provided, this control can also be achieved by the use of a single actuator and output shaft arrangement, reducing the cost and complexity of producing such an assembly.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

The invention claimed is:

1. A multi-channel disc valve assembly comprising:
    a first inlet chamber having a first inlet port;
    a second inlet chamber having a second inlet port;
    a multi-channel mixing chamber body having at least one first chamber opening fluidly communicable with the first inlet chamber and at least one second chamber opening fluidly communicable with the second inlet chamber, the multi-channel mixing chamber body having a plurality of outlet ports;
    a first disc valve sub-assembly positioned between the first inlet chamber and the multi-channel mixing chamber body, the first disc valve sub-assembly comprising a first movable disc; and
    a second disc valve sub-assembly positioned between the second inlet chamber and the multi-channel mixing chamber body, the second disc valve sub-assembly comprising a second movable disc;
    the first and second movable discs being rotatable to respectively alter a fluid flow pathway from the first inlet chamber to the multi-channel mixing chamber body and a fluid flow pathway from the second inlet chamber to the multi-channel mixing chamber body.

2. The multi-channel disc valve assembly as claimed in claim 1, wherein a relative configuration between the first movable disc and the at least one first chamber opening is different to a relative configuration between the second movable disc and the at least one second chamber opening.

3. The multi-channel disc valve assembly as claimed in claim 1, wherein the first disc valve sub-assembly comprises a first sealing element which has a matching shape to the at least one first chamber opening, the first sealing element being positioned between the first movable disc and the multi-channel mixing chamber body.

4. The multi-channel disc valve assembly as claimed in claim 3, wherein the first disc valve sub-assembly further comprises a first static plate against which the first movable disc is rotatable, and wherein the first static plate is formed as a disc having at least one aperture which is matched to the at least one first chamber opening.

5. The multi-channel disc valve assembly as claimed in claim 3, wherein the second disc valve sub-assembly comprises a second sealing element which has a matching shape to the at least one second chamber opening, the second sealing element being positioned between the second movable disc and the multi-channel mixing chamber body.

6. The multi-channel disc valve assembly as claimed in claim 5, wherein the second disc valve sub-assembly further comprises a second static plate against which the second movable disc is rotatable, and wherein the second static plate is formed as a disc having at least one aperture which is matched to at least one second chamber opening.

7. The multi-channel disc valve assembly as claimed in claim 1, wherein at least one of the first and second movable discs has a quarter-circle aperture therethrough.

8. The multi-channel disc valve assembly as claimed in claim 1, wherein the multi-channel mixing chamber body has two said outlet ports.

9. The multi-channel disc valve assembly as claimed in claim 1, wherein the multi-channel mixing chamber body has three said outlet ports.

10. The multi-channel disc valve assembly as claimed in claim 9, wherein a first end of the multi-channel mixing chamber body comprises three said first chamber openings corresponding with the three said outlet ports, and wherein a second end of the multi-channel mixing chamber body comprises two second said chamber openings corresponding with two of the three said outlet ports.

11. The multi-channel disc valve assembly as claimed in claim 1, wherein the first inlet chamber, multi-channel mixing chamber body, and second inlet chamber are provided in a stacked configuration.

12. The multi-channel disc valve assembly as claimed in claim 11, further comprising a shaft which is engaged with the first and second movable discs to permit simultaneous rotation thereof, and the multi-channel mixing chamber body comprises a shaft-receiving bore therethrough for receiving the shaft; the multi-channel disc valve assembly further comprising an actuator which is drivably coupled to drive both of the first and second movable discs.

13. The multi-channel disc valve assembly as claimed in claim 12, wherein the actuator is drivably coupled to a shaft to drive both of the first and second movable discs.

14. The multi-channel disc valve assembly as claimed in claim 1, further comprising a multi-part valve casing, a first valve casing part being provided for the first inlet chamber, a second valve casing part being provided for the second inlet chamber, and a third valve casing part being provided for the multi-channel mixing chamber body.

15. The multi-channel disc valve assembly as claimed in claim 1, wherein each of the first movable disc and second movable disc is formed from a ceramic material.

16. The multi-channel disc valve assembly as claimed in claim 1, wherein the multi-channel mixing chamber body comprises a plurality of fluidly-noncommunicable chamber body portions.

17. A multi-channel disc valve system comprising:
a first inlet chamber having a first inlet port;
a second inlet chamber having a second inlet port;
a mixing chamber assembly comprising:
a multi-channel mixing chamber body having at least one first chamber opening fluidly communicable with the first inlet chamber and at least one second chamber opening fluidly communicable with the second inlet chamber, the multi-channel mixing chamber body having a plurality of outlet ports;
a first disc valve sub-assembly positioned at a first end of the multi-channel mixing chamber body, the first disc valve sub-assembly comprising a first movable disc;
a second disc valve sub-assembly positioned at a second end of the multi-channel mixing chamber body, the second disc valve sub-assembly comprising a second movable disc; and
a drive transmission means comprising a shaft, the drive transmission is engaged with the first and second movable discs; and
an actuator drivably coupled to the shaft of the drive transmission means;
the first and second movable discs respectively alter a fluid flow pathway from the first inlet chamber to the multi-channel mixing chamber body and a fluid flow pathway from the second inlet chamber to the multi-channel mixing chamber body.

18. The multi-channel disc valve system as claimed in claim 17, wherein the mixing chamber assembly is fluidly communicable with the first and second inlet chambers such that a relative configuration between the first movable disc and the at least one first chamber opening is different to a relative configuration between the second movable disc and the at least one second chamber opening when the drive transmission means is driven by the actuator.

19. The multi-channel disc valve system as claimed in claim 17, wherein a plurality of different said mixing chamber assemblies is provided, each mixing chamber assembly being selectably engagable in fluid communication with the first and second inlet chambers to provide different fluid flow pathway configurations between the first inlet chamber and multi-channel mixing chamber body and between the second inlet chamber and the multi-channel mixing chamber body.

20. A method of assembling a multi-channel disc valve system as claimed in claim 17, the method comprising:
a] engaging the first inlet chamber at the first end of the multi-channel mixing chamber body of the mixing chamber assembly;
b] engaging the second inlet chamber at the second end of the multi-channel mixing chamber body of the mixing chamber assembly;
c] connecting the shaft to the actuator; and
d] securing the actuator, first inlet chamber, mixing chamber assembly and second inlet chamber together via a valve casing.

\* \* \* \* \*